United States Patent
Dressel et al.

(10) Patent No.: US 9,216,768 B1
(45) Date of Patent: Dec. 22, 2015

(54) VEHICLE CRASH MANAGEMENT APPARATUS AND METHODS OF USE AND MANUFACTURE THEREOF

(71) Applicant: Honda Motor Co., Ltd., Tokyo (JP)

(72) Inventors: Brian Eric Dressel, Columbus, OH (US); Andrew George Bakun, Dublin, OH (US); Yasuyuki Shibata, Shioya-gun Tochigi (JP); Stephen G. Rosepiler, Marysville, OH (US); Tony Berman, Hilliard, OH (US); Kevin A. Hothem, Dublin, OH (US); Brandon David Koester, Marysville, OH (US); Kohji Imuta, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/481,644

(22) Filed: Sep. 9, 2014

(51) Int. Cl.
   *B60N 99/00* (2006.01)
   *B62D 21/15* (2006.01)

(52) U.S. Cl.
   CPC .................... *B62D 21/155* (2013.01)

(58) Field of Classification Search
   CPC .................................................. B62D 21/155
   See application file for complete search history.

(56) References Cited

U.S. PATENT DOCUMENTS

| | | |
|---|---|---|
| 3,590,936 A | 7/1971 | Wessells et al. |
| 4,090,721 A | 5/1978 | Wedin et al. |
| 5,114,184 A | 5/1992 | Shimomura et al. |
| 5,228,741 A | 7/1993 | Ide |
| 5,772,245 A | 6/1998 | Mühlhausen |
| 6,817,656 B2 | 11/2004 | Stoffels et al. |
| 6,880,663 B2 | 4/2005 | Fujiki et al. |
| 7,004,274 B2 | 2/2006 | Shibasawa et al. |
| 7,032,961 B2 | 4/2006 | Matsuda |
| 7,264,304 B2 | 9/2007 | Carcioffi |

(Continued)

FOREIGN PATENT DOCUMENTS

| | | |
|---|---|---|
| GB | 2457591 A | 8/2009 |
| JP | 03-200487 A | 9/1991 |

(Continued)

OTHER PUBLICATIONS

Saito, M., et al., "Innovative Body Structure for Self-Protection of a Small Car in a Frontal Vehicle-to-Vehicle Crash," Honda R&D Co., Ltd. Tochigi R&D Center, Japan, Paper No. 239, http://www.nrd.nhtsa.dot.gov/pdf/esv/esv18/CD/Files/18ESV-000239.pdf (Accessed Mar. 24, 2014).

*Primary Examiner* — Lori L Lyjak
(74) *Attorney, Agent, or Firm* — Kenealy Vaidya LLP

(57) ABSTRACT

Some embodiments are directed to a vehicular energy management apparatus that includes a lower frame that defines a raised portion disposed longitudinally between a vehicular power source and fuel system components. The raised portion can include an inclined portion defining an acute angle relative to the longitudinal direction, and disposed to guide movement of the power source upwardly in a direction perpendicular to the longitudinal direction and away from the components of the fuel system upon movement of the power source in the longitudinal direction. A mount assembly that mounts the power source to the lower frame is configured to fail and thereby detach the power source from the lower frame upon application of a predetermined threshold impact energy being transmitted to the power source, thereby enabling the power source to move in the longitudinal direction and resulting in dissipation of at least a portion of the impact energy.

20 Claims, 10 Drawing Sheets

(56) References Cited

U.S. PATENT DOCUMENTS

| | | |
|---|---|---|
| 7,513,329 B2 | 4/2009 | Nakashima et al. |
| 7,552,963 B2 | 6/2009 | Yamaguchi et al. |
| 7,699,346 B2 | 4/2010 | Wehner et al. |
| 7,806,467 B2 | 10/2010 | Sangu |
| 7,950,724 B2 | 5/2011 | Yamaguchi et al. |
| 8,246,061 B2 | 8/2012 | Kang |
| 8,282,146 B2 | 10/2012 | Izutsu et al. |
| 8,480,102 B2 | 7/2013 | Yamada et al. |
| 2013/0200654 A1 | 8/2013 | Ogawa et al. |
| 2014/0070567 A1 | 3/2014 | Fujii et al. |

FOREIGN PATENT DOCUMENTS

| | | |
|---|---|---|
| JP | 11-180334 A | 7/1999 |
| JP | 3571704 B2 | 7/2004 |
| JP | 2005-112284 A | 4/2005 |
| JP | 4200014 B2 | 10/2008 |
| JP | 2010-115946 A | 5/2010 |

VEHICLE CRASH MANAGEMENT APPARATUS AND METHODS OF USE AND MANUFACTURE THEREOF

BACKGROUND

The disclosed subject matter relates to a vehicle crash management apparatus, and methods of use and manufacture thereof. More particularly, the disclosed subject matter relates to methods and apparatus that enhance vehicular energy management performance upon application of external stresses, such as may occur upon vehicular collisions or crash events.

Stresses, and in some cases extreme stresses, can be communicated to vehicles under certain circumstances, including vehicular collisions or crash events. These stresses can cause related art power source assemblies to become detached from the vehicular frame and/or otherwise move relative to various elements of the vehicle. Movement of the power source assembly into the vehicular passenger compartment or into contact with fuel system components may result in especially severe damage. This movement can be influenced by a variety of factors, including the magnitude of the stress (such as resulting from crash speed), mass, stiffness, and geometric interaction of various vehicular components.

SUMMARY

However, various vehicular design factors may make it challenging to sufficiently impede or prevent movement of the power source assembly into the vehicular passenger compartment and/or into contact with fuel system components upon application of significant amounts of stress. For example, space constraints and styling requirements may require the power source assembly to be disposed close to certain fuel system components (such as the fuel tank) and/or the passenger compartment. These constraints and requirements may also limit the use of structures for managing the stresses. These issues may be especially pronounced in cases of rear and mid-engine mounting.

It may therefore be beneficial to provide a vehicle crash management apparatus, and methods of use and manufacture thereof, that address at least one of the above and/or other challenges of related art vehicles. In particular, it may be beneficial to enhance vehicular energy management performance upon application of external stresses, such as by controlling movement of the power source assembly and/or mitigating energy caused by the external stress. For example, assemblies that mount the power source assembly to the vehicular frame assembly can be configured to absorb and transfer energy that originated from the external stress. In some of these and/or other embodiments, the vehicular frame can be configured to guide movement of the power source assembly away from certain elements of the fuel source assembly, such as the fuel tank. In some of these and/or other embodiments, the frame can be configured to form projections or extrusions that limit power source assembly movement. In some of these and/or other embodiments, the frame can be configured to include plates that shield or otherwise protect certain elements of the fuel source assembly.

Some embodiments are therefore directed to an energy management apparatus for use with a vehicle that includes a power source assembly and at least one vehicle component. The energy management apparatus can include an upper frame that at least partially encloses the power source assembly. The apparatus can also include a lower frame that defines a raised portion disposed longitudinally between the power source assembly and the at least one vehicle component. The raised portion can include an inclined portion that defines an acute angle relative to the longitudinal direction and is disposed to guide movement of the power source assembly upwardly in a direction substantially perpendicular to the longitudinal direction and away from the at least one vehicle component upon movement of the power source assembly in the longitudinal direction. The apparatus can also include a mount assembly that mounts the power source assembly to the lower frame. The mount assembly can be configured to detach the power source assembly from the lower frame upon application of a predetermined threshold impact energy being transmitted to the power source assembly, thereby enabling the power source assembly to move in the longitudinal direction and resulting in dissipation of at least a portion of the impact energy.

Some other embodiments are directed to an energy management system for use with a vehicle having an interior passenger compartment. The energy management system can include a power source assembly, and at least one vehicle component. The system can also include an upper frame that at least partially encloses the power source assembly. The upper frame can include a pair of vertically extending members and a cross frame member extending between the vertically extending members. The cross frame member can be disposed between the power source assembly and the interior passenger compartment. The system can also include a lower frame that defines a raised portion disposed longitudinally between the power source assembly and the at least one component. The raised portion can include an inclined portion that defines an acute angle relative to the longitudinal direction and is disposed to guide movement of the power source assembly upwardly in a direction perpendicular to the longitudinal direction and away from the at least one vehicle component upon movement of the power source assembly in the longitudinal direction. The system can further include a mount assembly that mounts the power source assembly to the lower frame. The mount assembly can be configured to detach the power source assembly from the lower frame upon application of a predetermined threshold impact energy being transmitted to the power source assembly that results from the external stresses, thereby enabling the power source assembly to move in the longitudinal direction and resulting in dissipation of at least a portion of the impact energy.

Still other embodiments are directed to a method of enhancing energy management performance upon application of external stresses to a vehicle that includes a power source assembly and at least one vehicle. The method can include enclosing the power source assembly with an upper frame, and mounting the power source assembly to a lower frame with a mount assembly that is configured to fail and thereby detach the power source assembly from the lower frame upon application of a predetermined threshold impact energy being transmitted to the power source assembly that results from the external stresses, thereby enabling the power source assembly to move in the longitudinal direction and resulting in dissipation of at least a portion of the impact energy. The method can further include guiding movement of the power source assembly upwardly in a direction perpendicular to the longitudinal direction and away from the at least one vehicle component upon movement of the power source assembly in the longitudinal direction. The guiding can be performed with a raised portion of the lower frame that is disposed longitudinally between the power source assembly and the at least one vehicle component, the raised portion including an inclined portion that defines an acute angle relative to the longitudinal direction.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

Figure 1:
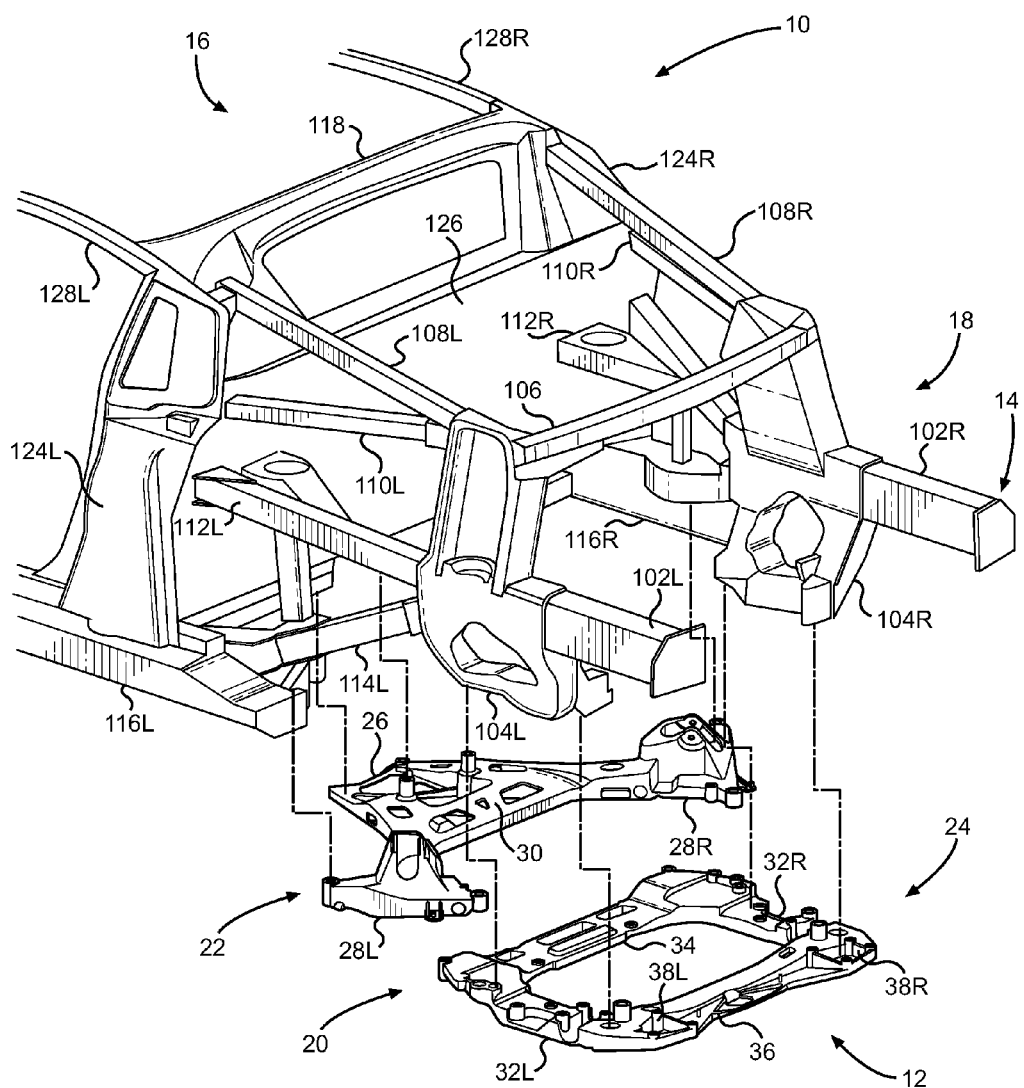
FIG. 1 is a partial, exploded, perspective view of a vehicle in accordance with the disclosed subject matter.
Figure 2:
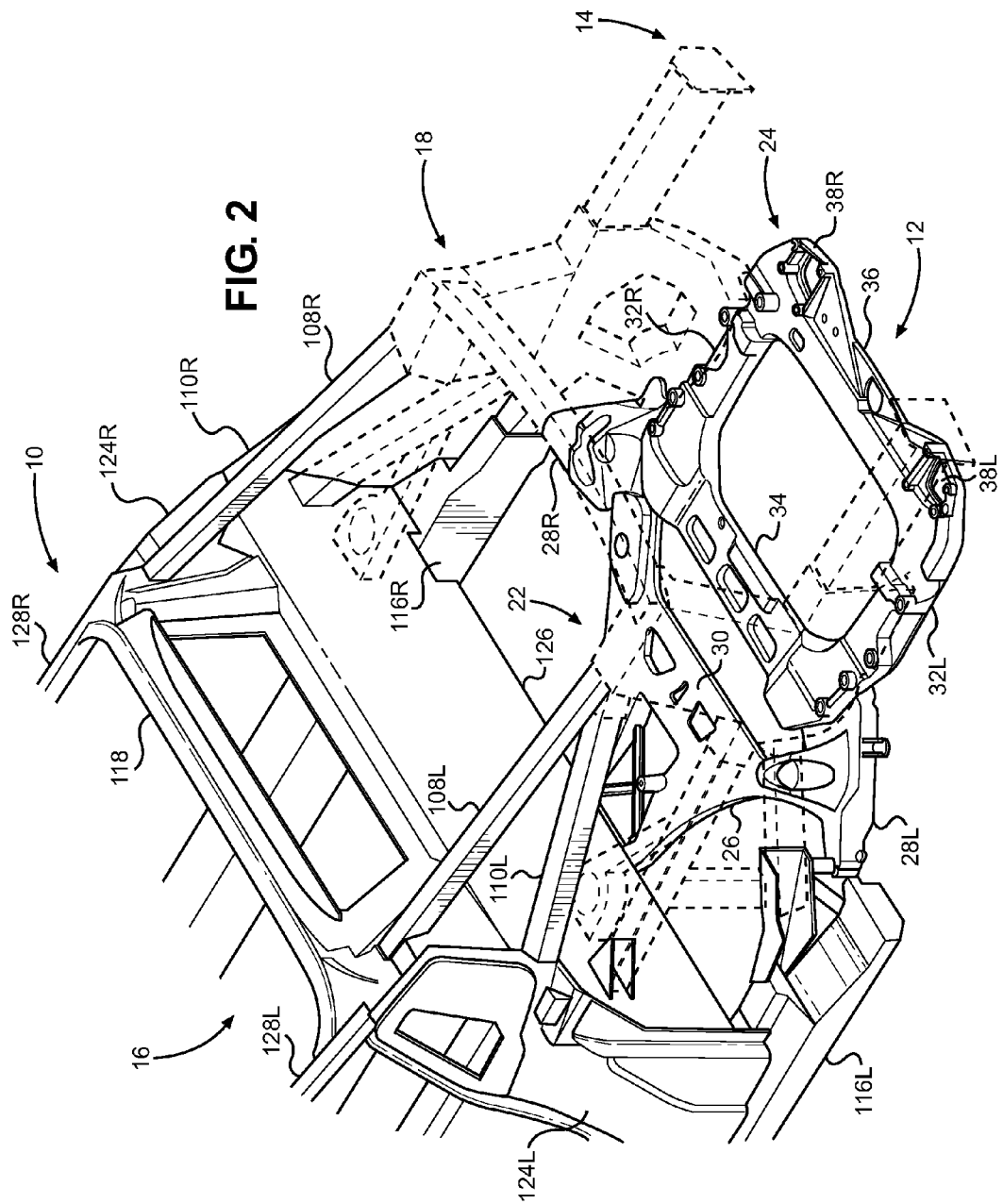
FIG. 2 is a partial perspective view of the vehicle of FIG. 1 in a partially assembled condition.
Figure 3:
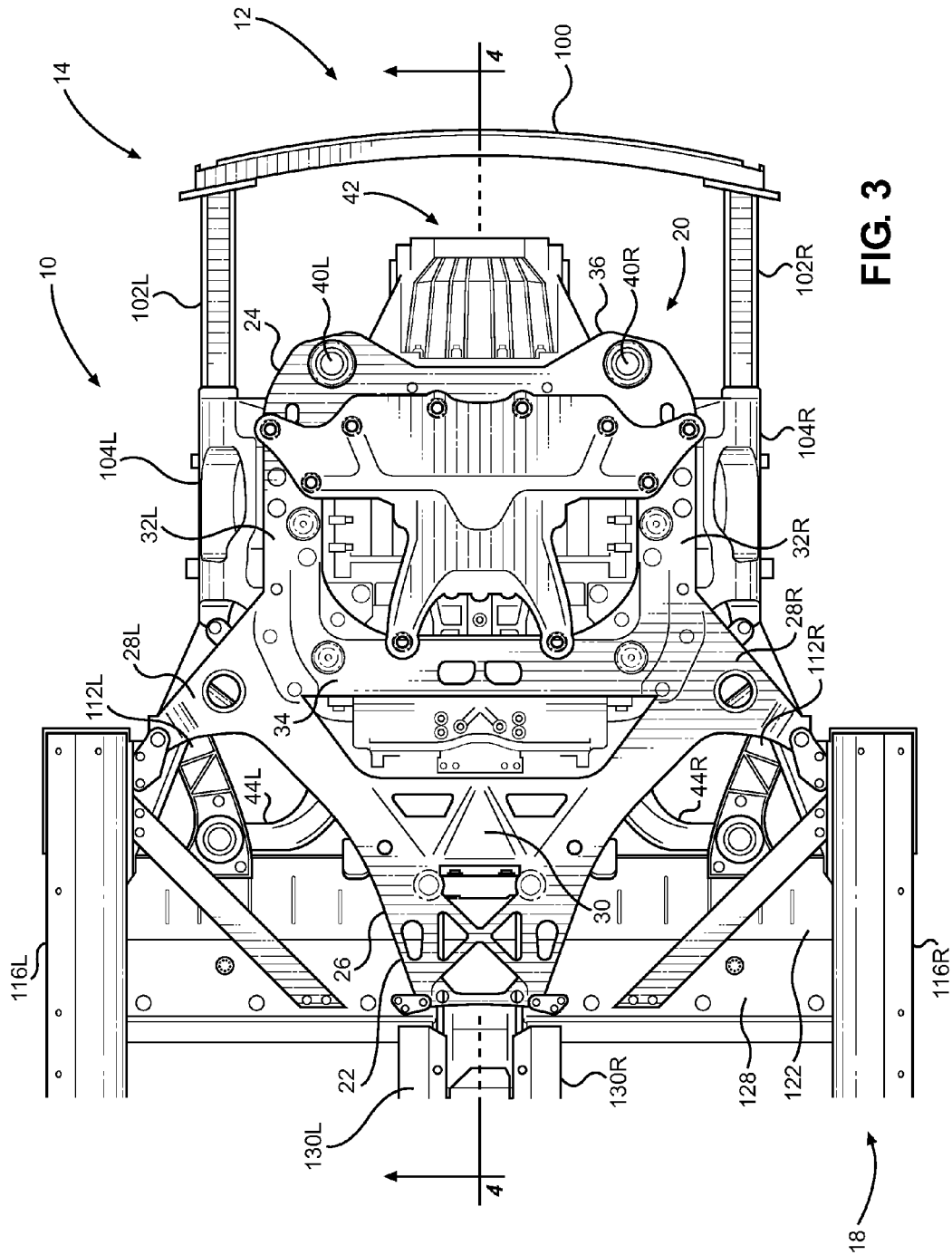
FIG. 3 is a partial bottom plan view of the vehicle of FIG. 2.

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. OVERVIEW

FIGS. 1-6, 8 and 9 illustrate an embodiment of a vehicle 10 made in accordance with the principles of the disclosed subject matter. The vehicle 10 can include a frame assembly 12, which can be configured to provide structural rigidity for the vehicle 10 and can provide mounting support for the various components and systems of the vehicle 10, such as but not limited to a power source, steering system, braking system, door(s), seat(s), instrument panel, energy supply system, climate control system, suspension components, exterior body panels, interior trim components, etc. The frame assembly 12 also can be configured to absorb and/or distribute energy input at one portion of the frame assembly 12 to another portion of the frame assembly 12 in order to impede, reduce or prevent damage to other portion(s) of the frame assembly 12, and to impede, reduce or prevent injury to any occupant(s) of the vehicle 10. By way of example only, energy can be input to the frame assembly 12 if the vehicle 10 impacts or is impacted by an object external to the vehicle 10.

The frame assembly 12 can extend in a longitudinal direction L from the front of the vehicle 10 to the rear of the vehicle 10. FIGS. 1-6, 8 and 9 show only a portion of the frame assembly 12 that extends from a first end 14 of the vehicle 10 to a passenger compartment 16. The remainder of the frame assembly 12 that continues through the passenger compartment and to the second end of the vehicle 10 is omitted from FIGS. 1-6, 8 and 9 for clarity and simplicity of the views. The first end 14 of the frame assembly 12 can be disposed at either the front end of the vehicle 10 or the rear end of the vehicle 10. The frame assembly 12 can be made from any appropriate known, related art or later developed material(s), such as but not limited to metal, metal alloy, plastic, carbon fiber, or any combination of these exemplary materials. Various systems and components, such as but not limited to body panels, glass, doors, a suspension system and related components, a steering system and related components, a powertrain system and related components, and components and systems for the passenger compartment, can be directly or indirectly attached to the frame assembly 12.

The frame assembly 12 can include a space frame assembly 18 and a lower frame assembly 20. The lower frame assembly 20 can be directly or indirectly connected to the space frame assembly 18 in any appropriate manner, such as but not limited to adhesive bonding, one or more welds, mechanical fasteners, or any combination of these exemplary manners of connection. Alternatively, the space frame assembly 18 and lower frame assembly 20 can be formed as a single homogenous or unitary structure, such as by being integrally molded.

II. LOWER FRAME ASSEMBLY 20

Referring to FIGS. 1-4, the lower frame assembly 20 can include a first sub-frame member 22 and a second sub-frame member 24. The first sub-frame member 22 can be directly or indirectly connected to the second sub-frame member 24 in any appropriate manner, such as but not limited to adhesive bonding, one or more welds, mechanical fasteners, or any combination of these exemplary manners of connection. Alternatively, the first sub-frame member 22 and second sub-frame member 24 can be formed as a single unitary structure, such as by being integrally molded.

A. First Sub-Frame Member 22

The first sub-frame member 22 can include a central portion 26 and a pair of lateral portions 28L, 28R. The central portion 26 and the lateral portions 28L, 28R can be integrally formed as a single homogenous unit, or as separate components that are directly or indirectly connected together in any appropriate manner, such as but not limited to mechanical fasteners, welding, adhesive bonding, inference fitting, or any combination of these exemplary connection techniques. The central portion 26 and the lateral portions can be formed from any appropriate known, related art or later developed material, such as but not limited to metal, metal alloy, plastic, carbon fiber, or any combination of these exemplary materials.

As illustrated in FIG. 1, each of the central portion 26 and the lateral portions 28L, 28R can include a plurality of mounting points configured to facilitate connection of the first sub-frame member 22 to the space frame assembly 18 in any appropriate manner, such as but not limited to mechanical fasteners, welding, adhesive bonding, or any combination of these exemplary or other connection methods.

Figure 4:
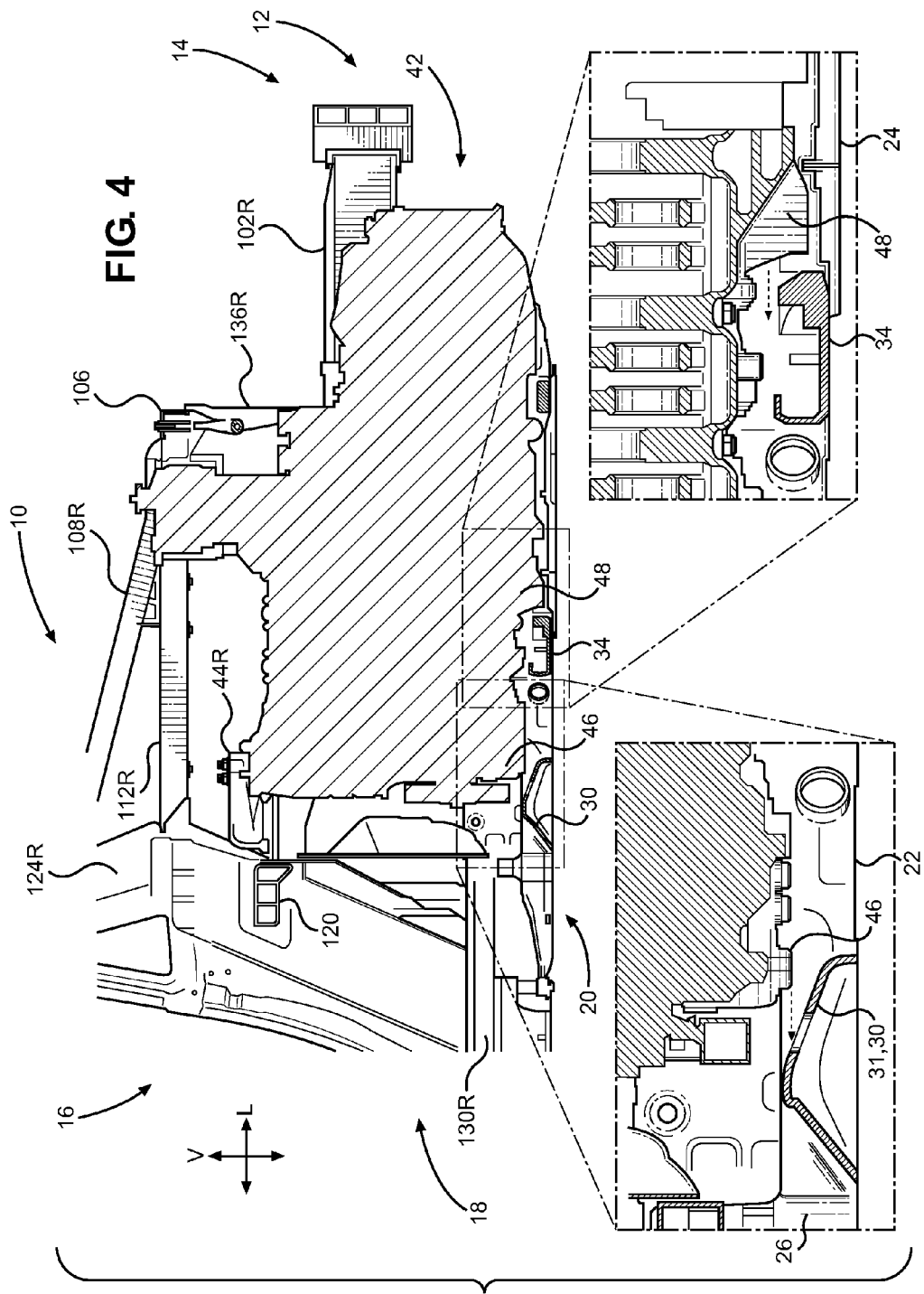
FIG. 4 is a cross-sectional view taken along line 4-4 of FIG. 3.

Returning to FIGS. 1-4, the central portion 26 of the first sub-frame member 22 can include a raised portion 30. The raised portion 30 can extend from the left lateral portion 28L to the right lateral portion 28R. As illustrated in FIG. 4, the raised portion 30 can include a first inclined portion 31 and a second inclined portion connected to the first inclined portion 31 at a peak of the raised portion 30. The first inclined portion 31 can be inclined away from the first end 14 in the longitudinal direction L of the vehicle 10. The second inclined portion can be inclined toward the first end 14 in the longitudinal direction L.

Referring to FIGS. 1-6, 8 and 9 and as will be explained in greater detail below, a power source assembly 42 can be mounted to at least one of the space frame assembly 18 and the lower frame assembly 20. As shown in FIG. 4, a leading portion 46 of the power source assembly 42 can be spaced from the first inclined portion 31 of the raised portion 30 in at least one of the vertical direction V and the longitudinal direction L. The first inclined portion 31 can be configured to be engaged by the leading portion 46 of the power source assembly 42 if the power source assembly 42 is displaced in the longitudinal direction L toward the passenger compartment 16. The first inclined portion 31 can be configured to deflect the power source assembly 42 upwardly in the vertical direction V, as viewed in FIG. 4, if the leading portion 46 of the power source assembly 42 is displaced into engagement with the first inclined portion 31.

The first inclined portion 31 can be positioned at a location intermediate certain component(s) and/or system(s) of the vehicle 10. In an exemplary embodiment, these component(s) or/and system(s) can include, but is/are not limited to, a fuel line, fuel tank, fuel filler pipe, brake line, electrical communication line, electronic control system, etc. The first inclined portion 31 can deflect the power source 42 away from any such component(s) and/or system(s) if the power source assembly 42 is displaced toward the passenger compartment 16 in the longitudinal direction L. As a result, the inclined surface 31 can impede, reduce, or prevent damage to any such component(s) and/or system(s) if the power source assembly 42 is displaced toward the passenger compartment 16 in the longitudinal direction L.

B. Second Sub-Frame Member 24

The second sub-frame member 24 can include a pair of lateral members 32L, 32R and a pair of cross members 34, 36. The lateral members 32L, 32R can be connected to the cross members 34, 36. The lateral members 32L, 32R can extend generally in the longitudinal direction L of the vehicle 10, and can be spaced apart by the cross members 34, 36. The cross members 34, 36 can extend generally in a direction that is substantially perpendicular to the longitudinal direction L, and can be spaced apart by the lateral members 34, 36 in the longitudinal direction L. The lateral members 32L, 32R can cooperate with the cross members 34, 36 to define a central open area. In exemplary embodiments, the lateral members 32L, 32R and the cross members 34, 36 can be formed as individual components, and then assembled together in any appropriate manner, such as but not limited to welding, mechanical fasteners, adhesive bonding, or any combination of these exemplary connection techniques. In other exemplary embodiments, the lateral members 32L, 32R and the cross members 34, 36 can be formed as a single unitary structure. The lateral members 32L, 32R and the cross members 34, 36 can be formed from any appropriate known, related art or later developed material, such as but not limited to metal, metal alloy, plastic, carbon fiber, or any combination of these exemplary materials.

The second sub-frame member 24 can include first power source mount areas 38L, 38R, which can be configured to receive first power source mount assemblies 40L, 40R. The first power source mount assemblies 40L, 40R can be configured to connect the power source assembly 42 to the second sub-frame member 24. The first power source mount assemblies 40L, 40R can be configured to dampen vibrations generated by the power source assembly 42 in order to reduce, minimize or prevent transmission of these vibrations to other portions of the vehicle 10, such as but not limited to the passenger compartment 16.

In some embodiments, the first power source mount assemblies 40L, 40R can each include an input member, a damping member and an output member. The damper member can be directly or indirectly connected to each of the input member and the output member, and can permit relative motion between the input member and the output member. The damper member can include any appropriate known, related art or later developed vibration absorbing material, such as but not limited to, rubber, elastomer, oil, or any combination of these exemplary materials. In other exemplary embodiments, the damping member can include a computer controlled actuator that can dampen the vibrations generated or otherwise output by the power source.

The first power source mount areas 38L, 38R can be formed at any appropriate one(s) of the lateral members 32L, 32R and the cross members 34, 36. In some embodiments, the first power source mount areas 38L, 38R can be formed adjacent the junctions of the second cross member 36 and each of the lateral frame members 32L, 32R. The first power source mount assemblies 40L, 40R can be directly or indirectly connected to the first power source mount areas 38L, 38R of the second sub-frame member 24 by any appropriate manner, such as but not limited to welding, mechanical fasteners, adhesive bonding, or any combination of these exemplary connection techniques.

III. SPACE FRAME ASSEMBLY 18

The space frame assembly 18 can include a bumper beam 100, pair of bumper support frame members 102L, 102R, and pair of central frame members 104L, 104R. The power source assembly 42 can be mounted to at least one of the space frame assembly 18 and the lower frame assembly 20, such that the bumper beam 100, pair of bumper support frame members 102L, 102R and pair of central frame members 104L, 104R extend about or around the power source assembly 42.

As will be described below, the central frame members 104L, 104R can be connected to other structure(s) of the space frame assembly 18. The bumper support frame members 102L, 102R can include a first end connected to a respective one of the central frame members 104L, 104R and a second end connected to the bumper beam 100. The bumper support frame members 102L, 102R can extend generally in the longitudinal direction L of the vehicle 10. The bumper beam 100 can extend between the bumper support frame members 102L, 102R. The bumper support frame members 102L, 102R can space the bumper beam 100 from the central frame members 104L, 104R in the longitudinal direction L of the vehicle 10.

The bumper beam 100 and/or the bumper support frame members 102L, 102R can be configured to deform in response to energy transmitted or input to the bumper beam 100 that is greater than a predetermined threshold energy. As noted above, this energy input can be the result of an object that is external to the vehicle 10 that impacts or is impacted by the bumper beam 100. The bumper beam 100 and/or the bumper support frame members 102L, 102R can be configured to absorb at least a portion of the impact energy through deformation. The bumper beam 100 and/or the bumper support frame members 102L, 102R can be configured to transmit any of the impact energy that is not absorbed by deformation to the central frame members 104L, 104R. The central frame members 104L, 104R can be configured to transmit this portion of the impact energy to at least another portion of the space frame assembly 18.

IV. IMPACT ENERGY, DEFORMATION AND DISPLACEMENT

Figure 5:
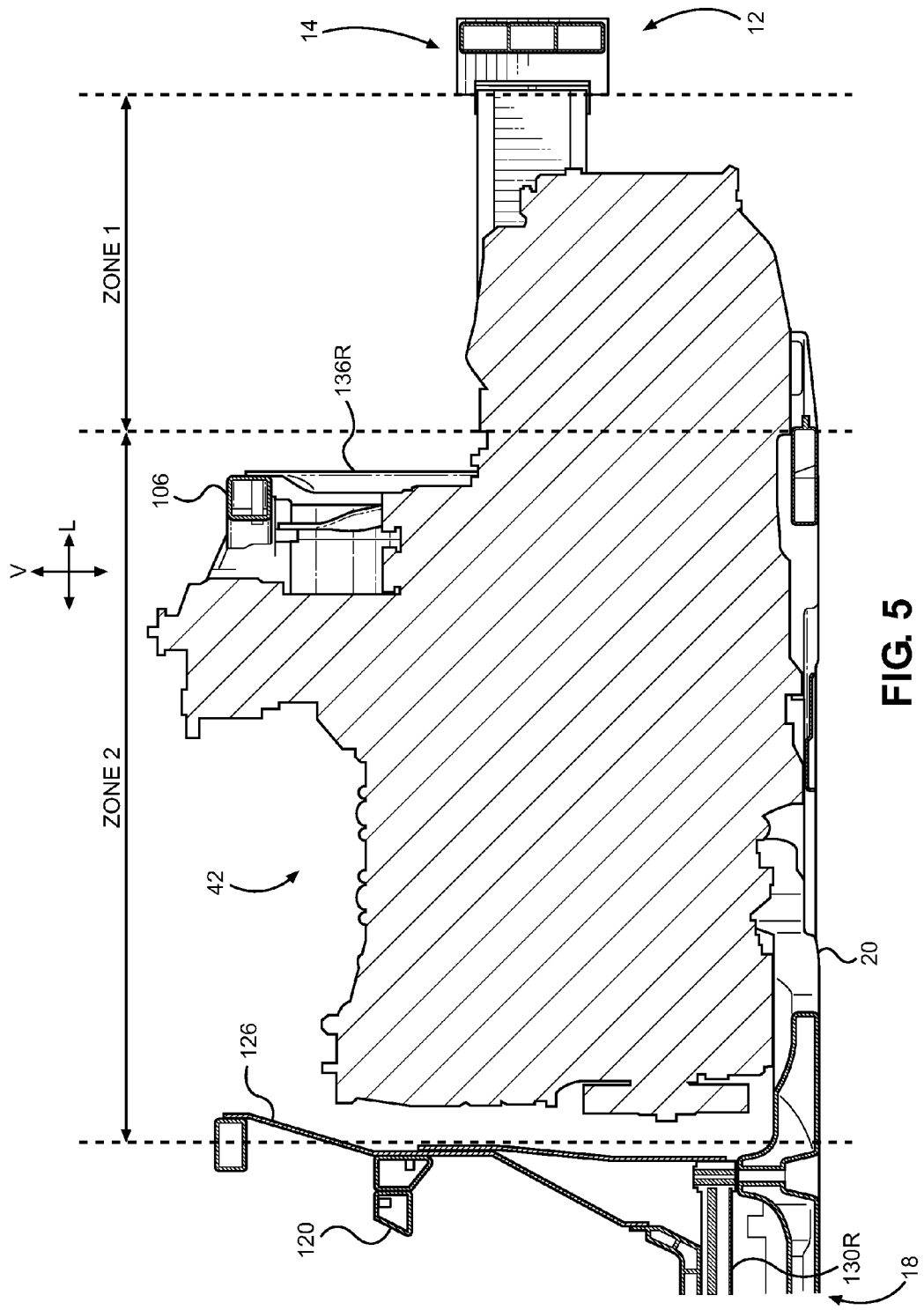
FIG. 5 is a cross-sectional view that shows a portion of the cross-sectional of FIG. 4, including a first collision management zone and a second collision zone.
Figure 6:
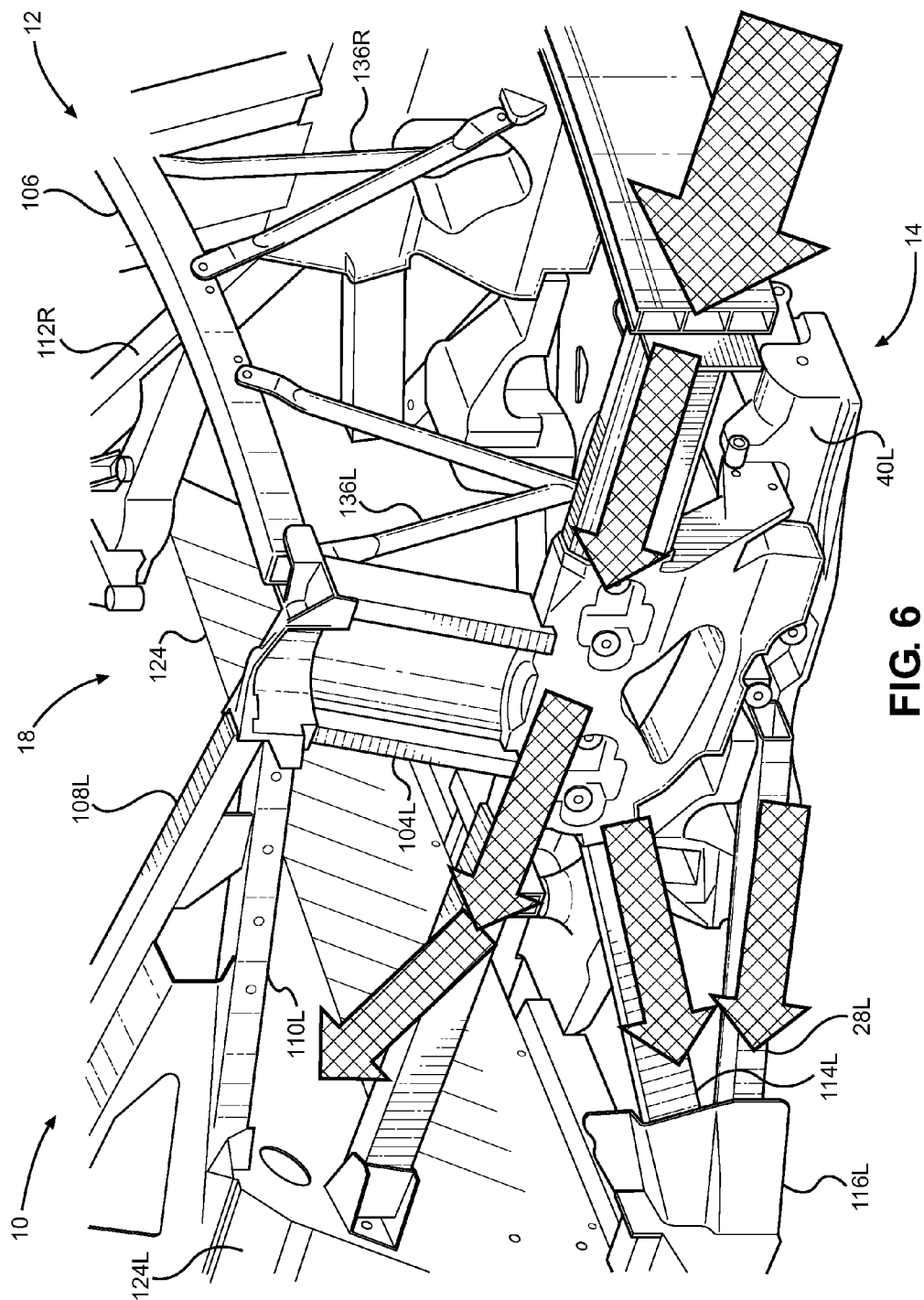
FIG. 6 is a partial perspective view of the vehicle of FIG. 2, and shows an exemplary collision load path.

FIG. 5 illustrates two zones of the space frame assembly 18. In Zone 1, impact energy input to the bumper beam 100 can be absorbed by deformation of at least one of the bumper beam 100, the first bumper support frame member 102L, and the second bumper support frame member 102R. The portion of the space frame assembly 18 generally located in Zone 2 can be configured to remain substantially rigid in response to any remainder portion of the impact energy, and to distribute this remainder portion of the impact energy to other portions of the space frame 18, such as but not limited to portions extending around the passenger compartment 16.

If the impact energy exceeds a predetermined threshold, deformation of the bumper beam 100 and/or the bumper support frame members 102L, 102R can be sufficient to cause the bumper beam 100 and/or the impacting object to engage the power source assembly 42. The power source assembly 42 can be a rigid body of relatively large mass. As such, the power source assembly 42 can transmit into the space frame assembly 18 substantially all of the impact energy input to the power source assembly 42 by the impacting object.

In order to impede, reduce or even minimize the amount of impact energy transmitted by the power source assembly 42 to the space frame assembly 18, the first power source mount assemblies 40L, 40R can be configured to fail if a predetermined threshold impact energy is transmitted to the power source assembly 42. Failure of the first power source mount assemblies 40L, 40R can permit the power source assembly 42 to move in the longitudinal direction L of the vehicle 10. As a result, at least a portion of the impact energy input to the power source assembly 42 can be dissipated by virtue of the mechanical failure of the first power source mount assemblies 40L, 40R, and an additional portion of the impact energy can be transformed into kinetic energy of the power source assembly 42, thereby reducing or even preventing the transmission of a portion of the impact energy into other portions of the space frame assembly 18.

If the displacement of the power source assembly 42 is sufficient to cause the leading portion 46 of the power source assembly 42 to engage the first inclined portion 31 of the first sub-frame member 22, then the first inclined portion 31 can deflect the power source assembly 42 upwardly in the vertical direction V, as viewed in FIGS. 4 and 5. As a result, any component(s) and/or system(s) mounted to the vehicle 10 that is/are on a side of the raised portion 30 opposite the leading portion 46 can be protected from damage, or at least the damage can be reduced, if the impacting object displaces the power source assembly 42 into engagement with the raised portion 30 of the first sub-frame member 22.

In order to reduce or limit the amount of displacement of the power source assembly 42 in the longitudinal direction L, the first cross member 34 can be positioned and configured to contact an engagement member 48 of the power source assembly 42, and resist or impede further displacement of the power source assembly 42 in the longitudinal direction L, if the leading portion 46 has engaged the first inclined portion 31 of the first sub-frame assembly 22. The engagement portion 48 can be constituted by any appropriate portion of the power source assembly 42. In some embodiments, the engagement portion 48 can be a functional component of the power source assembly 42, such as but not limited to a portion of the casing or housing enclosing at least a portion of the power source assembly 42. In other exemplary embodiments, the engagement portion 48 can be a component that is separate from the power source assembly 42 that can be connected to the power source assembly 42.

Figure 7A:
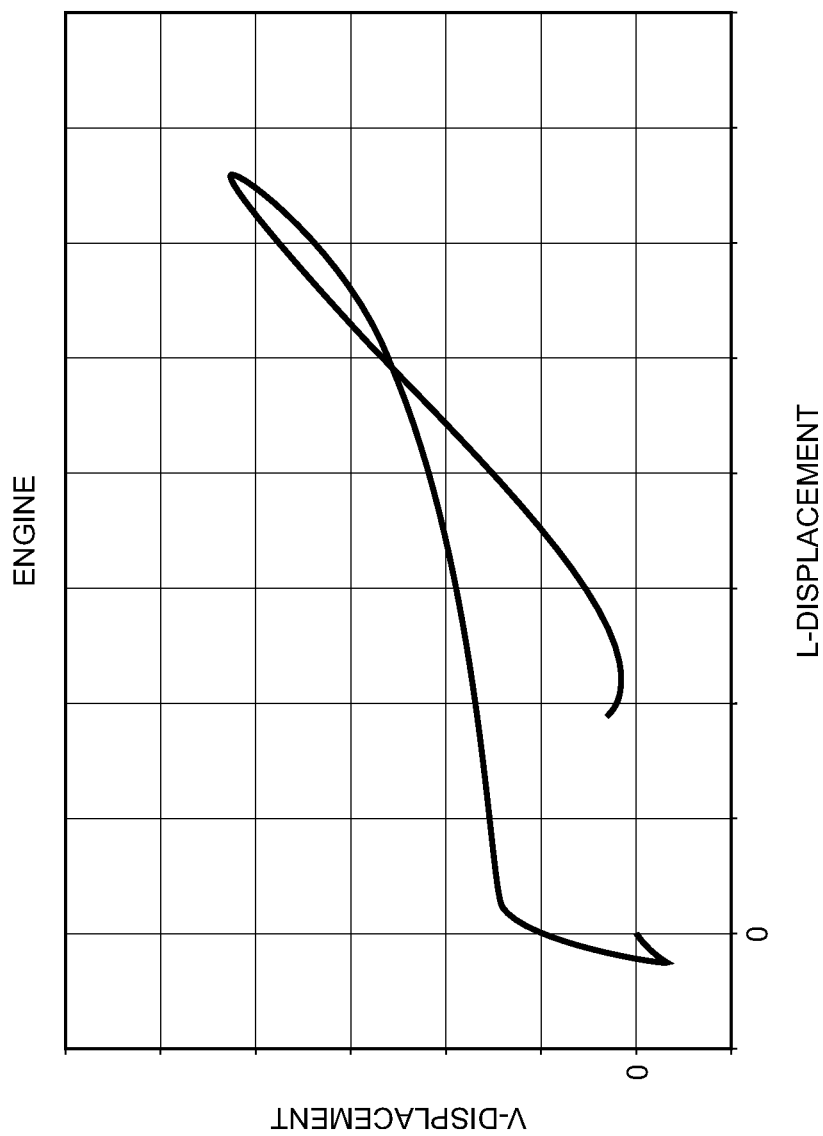
FIG. 7A is graph of displacement of a power source during an exemplary collision event if the power source is mounted in a vehicle made in accordance with the disclosed subject matter.

FIG. 7A is a graph of displacement of a power source during an exemplary collision, and in particular a plot of the displacement of the power source assembly 42 in response to an exemplary impact energy transmitted to the power source assembly 42. As demonstrated by this exemplary plot of power source displacement, contact of the first inclined portion 31 of the first sub-frame member 22 by the power source assembly 42 can deflect the power source assembly 42 upwardly in the vertical direction V, until the displacement in the longitudinal direction L of the power source assembly 42 reaches a maximum value. Additionally, this displacement plot shows that the power source assembly 42 can move downwardly in the vertical direction V. However, if this downward displacement occurs, it can be limited to displacement in the longitudinal direction L that is toward the first end 14 and away from the component(s) and/or system(s) protected by the first inclined portion 31 of the first sub-frame member 22.

Figure 7B:
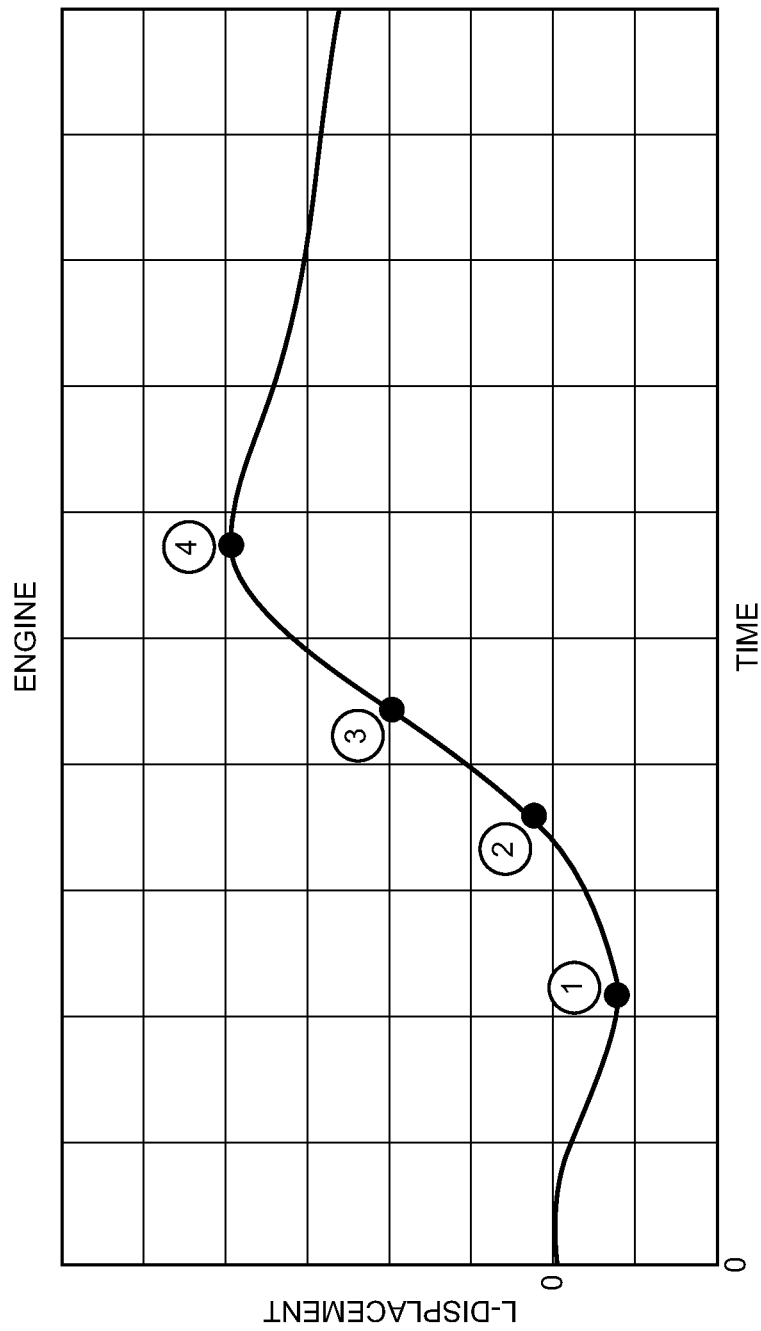
FIG. 7B is graph of displacement of a power source during an exemplary collision event if the power source is mounted in a vehicle made in accordance with the disclosed subject matter.

FIG. 7B is a graph of displacement of a power source during an exemplary collision plotted over time, and in particular a plot of the displacement of the power source assembly 42 in response to an exemplary impact energy transmitted to the power source assembly 42. At point 1, the power source assembly 42 can come into contact with the impacting/impacted object. At point 2, the first power source mount assemblies 40L, 40R can become detached from the power source assembly 42 and/or the second sub-frame member 24. At point 3, the engagement member 48 can contact the first cross member 34. At point 4, the leading end of the power source assembly 42 can come to rest on inclined portion 31 of the raised portion 30 of the first sub-frame member 22.

Thus, in view of FIGS. 7A and 7B the lower frame assembly 20 and the first power source mount assemblies 40L, 40R can cooperate with the power source assembly 42 to impede, reduce or prevent impact energy transmitted through the power source assembly 42 to the remainder of the space frame assembly 18 and/or other component(s) and/or system(s) mounted on the vehicle 10. Additionally, the lower frame assembly 20 can control the direction and magnitude of the displacement of the power source assembly 42 in response to an impact energy applied to the power source assembly 42, such as by virtue of the first inclined portion 31.

V. ADDITIONAL COMPONENTS OF THE SPACE FRAME ASSEMBLY 18

As discussed above, the space frame assembly 18 can include a portion that is configured to transmit impact energy without deformation. This portion of the space frame assembly 18 can include the central frame members 104L, 104R discussed above. The space frame assembly 18 can also include at least one portion (in addition to the lower frame assembly 20) that can control the magnitude of the displacement of the power source assembly 42 in response to an impact energy applied to the power source assembly 42. These portions are described below with reference to FIGS. 1-6, 8 and 9.

The space frame assembly 18 can include a first cross frame member 106, pair of first frame members 108L, 108R, pair of second frame members 110L, 110R, pair of third frame members 112L, 112R, pair of fourth frame members 114L, 114R, pair of fifth frame members 116L, 116R, second cross frame member 118, third cross frame member 120, fourth cross frame member 122, pair of pillar frame members 124L, 124R, a pair of sixth cross frame members 128L, 128R, and pair of seventh frame members 130L, 130R.

These elements can be made from any appropriate known, related art or later developed material, such as but not limited to metal, metal alloy, plastic, carbon fiber, or any combination of these exemplary materials. These elements can also be formed of any appropriate external shape and cross-sectional shape, such as but not limited to a hollow beam, a solid beam, a polygonal cross-section shape, a curved cross-sectional shape, a straight beam, a curved beam, or any combination of these exemplary shapes. These elements can be formed by any appropriate method, such as but not limited to casting, stamping, molding, hydroforming, extruding, hot forging, cold forging, rolling, etc. Any of these elements can be formed from a plurality of components that are connected together in any appropriate manner, such as but not limited to welding, mechanical fasteners, adhesive bonding, or any combination of these exemplary connection techniques, or alternatively there elements can be unitarily formed. These elements can be directly or indirectly connected together in any appropriate manner, such as but not limited to welding, mechanical fasteners, adhesive bonding, or any combination of these exemplary connection techniques in order to achieve the exemplary arrangement described below. Alternatively, all or any combination of these elements can be formed unitarily.

The central frame members 104L, 104R can include a plurality of connection locations. The respective bumper support frame members 102L, 102R can be connected to a first connection location of the respective central frame members 104L, 104R. The first connection location can be positioned at a middle portion of the respective central frame members 104L, 104R. The bumper support frame members 102L, 102R can space the central frame portions 104L, 104R from the first end 14 in the longitudinal direction L of the vehicle 10. In some embodiments, the bumper support frame members 102L, 102R can be configured as hollow beams formed from a stamped sheet of metal that can be bent into the desired closed cross-sectional shape, and then welded at the seam. In other embodiments, the bumper support frame members 102L, 102R can be formed by an extrusion process. In other embodiments, the bumper support frame members 102L, 102R can be formed by a hydroforming process.

The first cross frame member 106 can be connected to each of the central frame members 104L, 104R at respective second connection locations. The second connection locations can be positioned above the first connection locations, as viewed in FIGS. 1-6, 8 and 9. The first cross frame member 106 can extend from the left central frame member 104L to the right central frame member 104R in a direction that can be substantially perpendicular to the longitudinal axis L of the vehicle 10. In some embodiments, the first cross frame member 106 can extend between the left central frame member 104L and the right central frame member 104R along an arcuate path. In other exemplary embodiments, the central frame member 106 can extend along a substantially linear path. In other exemplary embodiments, the central frame member 106 can include at least one linear portion and at least one arcuate portion.

The pillar frame members 124L, 124R can include a plurality of connection portions. The first frame members 108L, 108R can include respective first ends connected to the respective pillar frame members 124L, 124R at respective first connection locations of the pillar frame members 124L, 124R. The first connection locations of the pillar frame members 124L, 124R can be adjacent respective top ends of the pillar frame members 124L, 124R as viewed in FIGS. 1-6, 8 and 9. The first frame members 108L, 108R can include respective second ends connected to the central frames members 104L, 104R at respective third connection locations. The third connection locations of the central frame members 104L, 104R can be above the respective first connection locations of the central frame members 104L, 104R and can be spaced from the respective second connection portions of the central frame members 104L, 104R in the longitudinal direction L toward the passenger compartment 16. The first frame members 108L, 108R can extend generally in the longitudinal direction L of the vehicle 10. The first frame members 108L, 108R can be inclined at an acute angle relative to the horizontal direction as viewed in FIGS. 1-6, 8 and 9. The first frame members 108L, 108R can be inclined in the longitudinal direction L and away from the first end 14 of the vehicle 10.

The second frame members 110L, 110R can include respective first ends connected to the respective pillar frame members 124L, 124R at respective second connection locations of the pillar frame members 124L, 124R. The second connection locations of the pillar frame members 124L, 124R can be spaced downward in the vertical direction V of the vehicle from the first connection locations of the pillar frame members 124L, 124R as viewed in FIGS. 1-6, 8 and 9. The second frame members 110L, 110R can include respective second ends connected to the central frame members 104L, 104R at respective fourth connection locations. The fourth connection locations of the central frame members 104L, 104R can be above the respective first connection locations of the central frame members 104L, 104R, can be adjacent and below the third connection locations of the central frame members 104L, 104R, and can be spaced from the respective second connection portions of the central frame members 104L, 104R in the longitudinal direction L toward the passenger compartment 16. The second frame members 110L, 110R can extend generally in the longitudinal direction L of the vehicle 10. The first frame members 110L, 110R can extend substantially parallel to the horizontal direction as viewed in FIGS. 1-6, 8 and 9.

The third frame members 112L, 112R can include respective first ends connected to the respective pillar frame members 124L, 124R at respective third connection locations of the pillar frame members 124L, 124R. The third connection locations of the pillar frame members 124L, 124R can be at a position that is below the second connection locations of the pillar frame members 124L, 124R as viewed in FIGS. 1-6, 8 and 9. The first frame members 108L, 108R can include respective second ends connected to the central frames members 104L, 104R at respective fifth connection locations. The fifth connection locations of the central frame members 104L, 104R can be at substantially the same level in the vertical direction V of the vehicle 10 as the respective first connection locations of the central frame members 104L, 104R as viewed in FIGS. 1-6, 8 and 9. The fifth connection portions of the central frame members 104L, 104R can be spaced downwardly from the respective second, third and fourth connection locations of the central frame members 104L, 104R in the vertical direction L as viewed in FIGS. 1-6, 8 and 9. The third frame members 112L, 112R can extend generally in the longitudinal direction L of the vehicle 10. The third frame members 112L, 112R can be inclined at an acute angle relative to the horizontal direction as viewed in FIGS. 1-6, 8 and 9. The third frame members 112L, 12R can be inclined in the longitudinal direction L and away from the first end 14 of the vehicle 10. The third frame members 112L, 112R can extend in a direction that is substantially parallel to the first frame members 108L, 108R.

The fourth frame members 114L, 114R can include respective first ends connected to the either the respective pillar frame members 124L, 124R at respective fourth connection locations of the pillar frame members 124L, 124R or to the respective fifth frame members 116L, 116R. The fourth connection locations of the pillar frame members 124L, 124R can be at a position that is below the second connection locations of the pillar frame members 124L, 124R and below the third connection locations of the pillar frame members 124L, 124R as viewed in FIGS. 1-6, 8 and 9. The fourth frame members 114L, 114R can include respective second ends connected to the central frame members 104L, 104R at respective sixth connection locations. The sixth connection portions of the central frame members 104L, 104R can be spaced downwardly from the respective second, third, fourth and fifth connection locations of the central frame members 104L, 104R in the vertical direction L as viewed in FIGS. 1-6, 8 and 9. The fourth frame members 114L, 114R can extend generally in the longitudinal direction L of the vehicle 10. The fourth frame members 114L, 114R can be inclined at an acute angle relative to the horizontal direction as viewed in FIGS. 1-6, 8 and 9. The third frame members 112L, 12R can be inclined in the longitudinal direction L and toward from the first end 14 of the vehicle 10. The fourth frame members 114L, 114R can extend in a direction substantially parallel to the first frame members 108L, 108R.

The lateral frame portions 28L, 28R of the first sub-frame member 22 can be connected to the fifth frame members 116L, 116R adjacent respective ends of the fifth frame members 116L, 116R. The central frame portion 26 of the first sub-frame member 22 can be connected to each of the seventh frame members 130L, 130R.

The lateral members 32L, 32R of second sub-frame member 24 can be connected to the respective bottom ends of the central frame members 104L, 104R. The first, second, third fourth, fifth and sixth connection locations of the central frame members 104L, 104R can be spaced above the bottom ends of the central frame members 104L, 104R in the vertical direction V of the vehicle 10 as viewed in FIGS. 1-6, 8 and 9.

The fifth frame members 116L, 116R can extend generally in the longitudinal direction L of the vehicle 10. The fifth frame members 116L, 116R can extend adjacent the outer sides of the vehicle 10.

The second cross frame member 118 can be connected to each of the pillar frame members 116L, 116R at a top end of the pillar frame members 116L, 116R. The second cross frame member 118 can extend from the left fifth frame member 116L to the right fifth frame member 116R in a direction that is substantially perpendicular to the longitudinal direction L of the vehicle 10.

The third cross frame member 120 can be connected to each of the pillar frame members 124L, 124R adjacent to the second connection location of the pillar frame members 124L, 124R. The third cross frame member 120 can extend from the left fifth frame member 116L to the right fifth frame member 116R in a direction that can be substantially perpendicular to the longitudinal direction L of the vehicle 10.

The third cross frame member 120 can be located below the second cross frame member 118 in the vertical direction V of the vehicle 10 as viewed in FIGS. 1-6, 8 and 9. The third cross frame member 120 can be positioned at a height along the vertical direction V of the vehicle 10, such that if the power source assembly 42 is displaced in the longitudinal direction L toward the passenger compartment 16, the third cross frame member 120 can engage the power source assembly 42 and can thereby impede or limit movement of the power source assembly 42 in the longitudinal direction L.

Second power source mount assemblies 44L, 44R can be configured to connect the power source assembly 42 to the third cross frame member 120. The second power source mount assemblies 44L, 44R can be configured to dampen vibrations generated by the power source assembly 42 in order to reduce, minimize or even prevent transmission of these vibrations to other portions of the vehicle 10, such as but not limited to the passenger compartment 16.

In some embodiments, the second power source mount assemblies 44L, 44R can each include an input member, a damping member and an output member. The damper member can be directly or indirectly connected to each of the input member and the output member, and can permit relative motion between the input member and the output member. The damper member can include any appropriate known, related art or later developed vibration absorbing material, such as but not limited to, rubber, elastomer, oil, or any combination of these exemplary materials. In other exemplary embodiments, the damping member can include a computer controlled actuator that can dampen the vibrations output by the power source.

The fourth cross frame member 122 can be connected to each of the pillar frame members 124L, 124R adjacent the fourth connection location of the pillar frame members 124L, 124R. The fourth cross frame member 122 can extend from the left fifth frame member 116L to the right fifth frame member 116R in a direction that is substantially perpendicular to the longitudinal direction L of the vehicle 10. The fourth cross frame member 122 can be located below the second cross frame member 118 and the third cross frame member 120 in the vertical direction V of the vehicle 10 as viewed in FIGS. 1-6, 8 and 9.

The seventh frame members 130L, 130R can be connected at one end to the fourth cross frame member 122 at a middle portion of the fourth cross frame member 122.

A panel member 126 can be connected to the pillar frame members 124L, 124R, the third cross frame member 120 and the fourth cross frame member 122 in any appropriate manner, such as but not limited to welding, mechanical fasteners, adhesive bonding, or any combination of these exemplary connection techniques. The panel member 126 can be formed from any appropriate known, related art or later developed material, such as but not limited to metal, metal alloy, plastic, carbon fiber, or any combination of these exemplary materials. The panel member 126 can extend up to the second cross member 118. The panel member 126 can include an opening configured to receive and support a window assembly therein.

A floor panel assembly 132 can be connected to the fifth frame members 116L, 116R and the seventh frame members 130L, 130R in any appropriate manner, such as but not limited to welding, mechanical fasteners, adhesive bonding, or any combination of these exemplary connection techniques. The floor panel assembly 132 can be formed from any appropriate known, related art or later developed material, such as but not limited to metal, metal alloy, plastic, carbon fiber, or any combination of these exemplary materials. The floor panel assembly 132 can be formed as a single unitary structure, or the floor assembly 132 can include a plurality of components that re connected together.

The space frame assembly 18 can include a pair of brace members 136L, 136R. Each of the brace members 136L, 136R can be connected to a central portion of the first cross frame member 106. The brace members 136L, 136R can be connected to the respective central frame members 104L, 104R at a plurality of connection locations. The brace members 136L, 136R can impede or limit displacement of the left central frame portion 104L toward/away from the right central frame member 104R under certain circumstances, such as if the vehicle 10 traverses an uneven pathway.

VI. ALTERNATIVE EMBODIMENT OF FIGS. 8 AND 9

Figure 8:
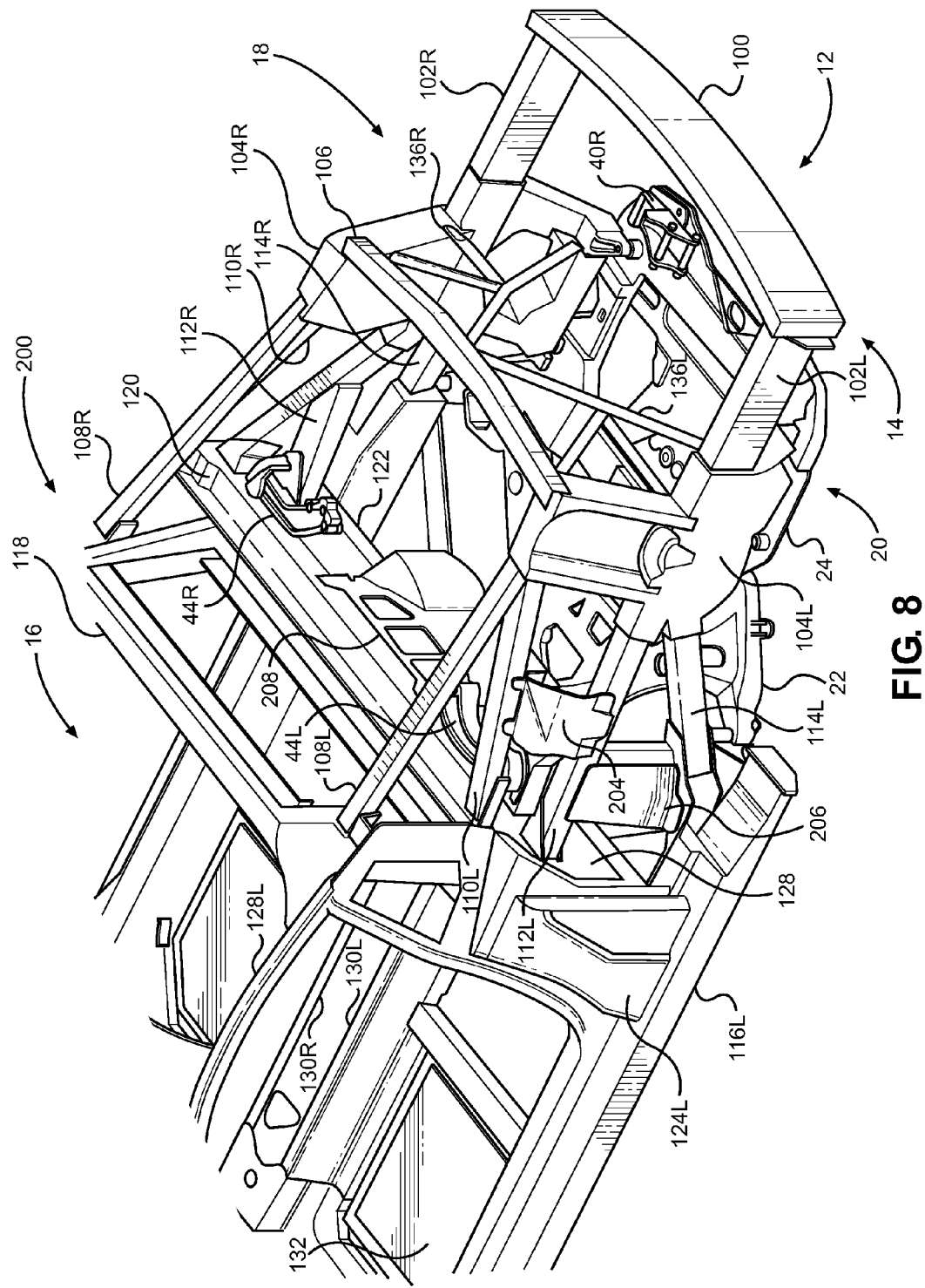
FIG. 8 is partial perspective view of an alternative exemplary embodiment of a vehicle made in accordance with the disclosed subject matter.
Figure 9:
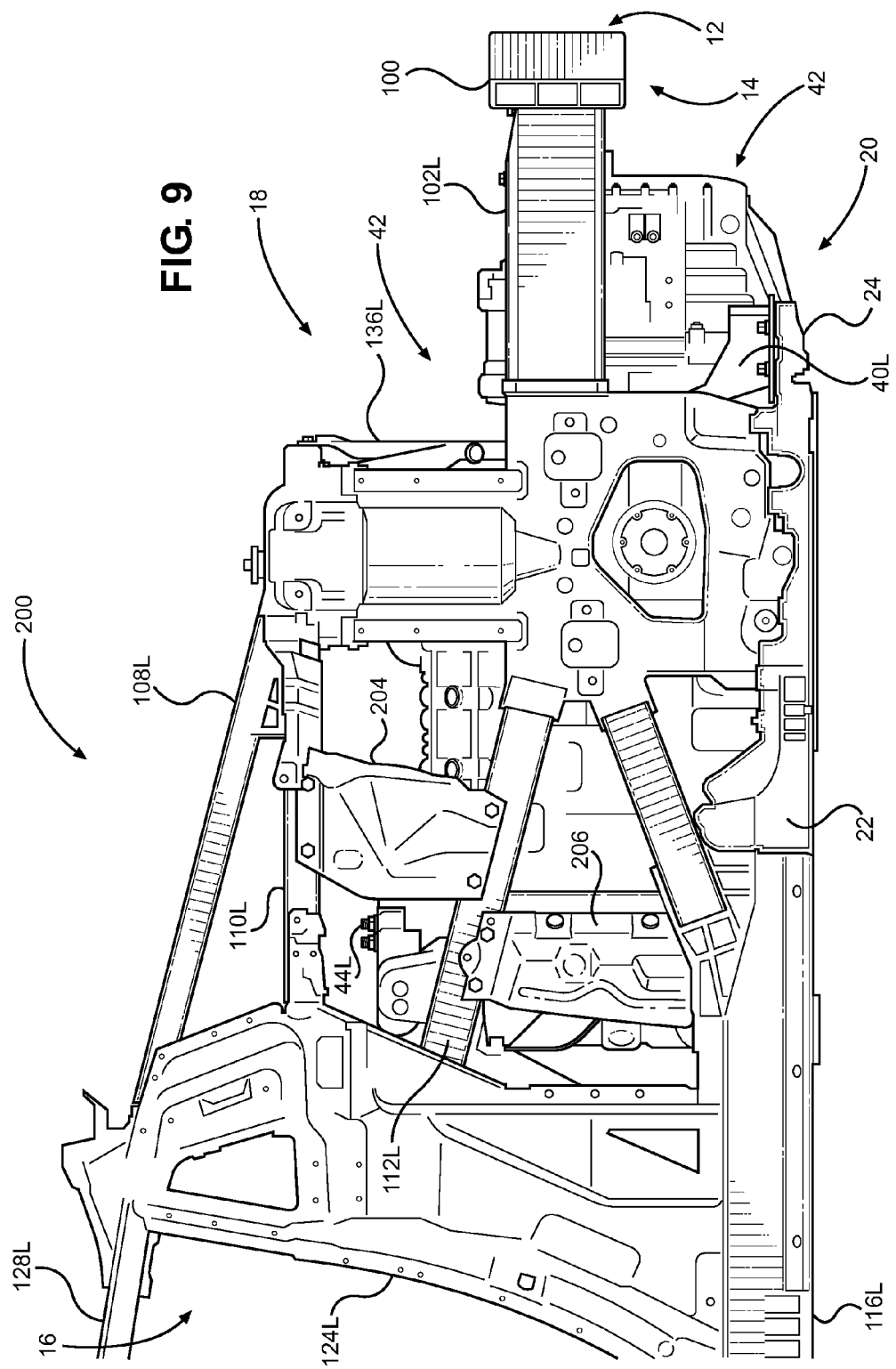
FIG. 9 is a partial side plan view of the vehicle of FIG. 8.

FIGS. 8 and 9 show an alternative exemplary embodiment of a vehicle 200, which can include the frame assembly 12 and the power source 42 described above with respect to FIGS. 1-6. The vehicle 200 can include a fuel system protection assembly 202 having a first panel 204, second panel 206 and third panel 208.

The first panel 204 can be connected to the left second frame member 110L and to the left third frame member 112L. The second panel 206 can be connected to the left third frame member 112L and to the left fourth frame member 114L. The third panel 208 can be connected to the third cross frame member 120 and to the fourth cross frame member 122. The panels 204, 206, 208 can be positioned between the power source assembly 42 and component(s) of the fuel system, if the power source assembly 42 includes an internal combustion engine. This structure shields the fuel system component(s) from the power source assembly 42, such as to impede or prevent direct contact between the fuel system component(s) and the power source assembly 42. This shielding may be especially beneficial in situations where the power source assembly 42 may translate longitudinally to such an extent that it may collide with the fuel system component(s), which may be sensitive to such impacts.

VII. ENGINE COMPONENTS

The power source assembly 42 can include any one of an internal combustion engine, an electric motor, and a hybrid of an internal combustion engine and an electric motor. The internal combustion engine or the hybrid power source can have an engine output axis that is oriented in the longitudinal direction L or in the traverse direction of the vehicle 10. The engine can be mounted forward of the front axles, rearward of the rear axles, or intermediate the front and rear axles ("mid-mounted"). In the exemplary embodiment of FIGS. 1-6, 8 and 9, the power source assembly 42 can include longitudinally-oriented, mid-mounted internal combustion engine.

The power source assembly 42 can include a transmission. The transmission can be an automatic transmission, a manual transmission, or a semi-automatic transmission. The transmission can include an input shaft, an output shaft, and a speed ratio assembly. The coupling can connect the engine output shaft and/or the electric motor output shaft to the input shaft. The coupling can permit selective engagement/disengagement of the input shaft with the engine output shaft and/or the electric motor output shaft, or at least relative rotation of the engine output shaft with respect to the input shaft, in any appropriate manner. Exemplary couplings can include, but are not limited to, a friction disc clutch and a torque converter.

The speed ratio assembly can connect the input shaft to the transmission output shaft such that the transmission output shaft can rotate at variable speeds relative to the input shaft. The speed ratio assembly can be a stepped speed ratio assembly or a continuously variable speed ratio assembly, as is known in the art. The transmission input shaft can be referred to as a mainshaft.

VIII. OTHER ALTERNATIVES

While certain embodiments of the invention are described above, and FIGS. 1-9 disclose the best mode for practicing the various inventive aspects, it should be understood that the invention can be embodied and configured in many different ways without departing from the spirit and scope of the invention.

For example, the raised portion 30 of the central frame portion 26 of the first sub-frame member 22 is shown in the figures as being spaced from and immediately adjacent a bottom corner of the power source assembly 42 opposite the vehicle first end 14. In this configuration, the power source assembly 42 needs to move longitudinally L a relatively short distance before contacting the raised portion, and then being guided vertically V upward, which may be beneficial by impeding or preventing contact between the power source assembly 42 and sensitive components, such as the fuel tank. In other words, guiding the power source assembly 42 upward provides clearance between the power source assembly 42 and the fuel tank upon occurrence of a significant impact.

However, the raised portion 30 can be disposed at any other location that is beneficial. For example, the raised portion 30 can be in contact with the power source assembly 42, such that any longitudinal L movement of the power source assembly 42 causes the raised portion 30 to guide the power source assembly 42 vertically V. Alternatively, the raised portion 30 can be spaced a relatively longer distance from the power source assembly 42, such that a relatively longer distance of longitudinal L movement of the power source assembly 42 causes the raised portion 30 to guide the power source assembly 42 vertically V.

The raised portion 30 of the central frame portion 26 of the first sub-frame member 22 is shown in the figures as including three discrete segments in cross-section, including: 1) a generally vertically extending member closest to the vehicle first end 14, 2) the inclined portion 31 defining an obtuse angle (slightly larger than 90 degrees) with the vertically extending member (or defining an acute angle relative to the longitudinal direction) so as to form a gradually inclined surface relative to the vehicle front end 14, and 3) a declining portion that defines an angle of decline that exceeds the angle of incline of the inclined portion 31, i.e., the declining portion declines at a steeper angle than the gradual incline of the inclined portion 31.

However, embodiments are intended to include or otherwise cover any structure that is able to guide the power source assembly 42 upwardly upon being displaced in the longitudinal direction. For example, the raised portion can be formed by two separate segments, such as by not including the vertically extending member. Also, the relative angles of incline and decline can be different, such as by making the angle of incline of the inclined portion 31 steeper, and/or making the angle of decline of the declining portion less steep.

In still other embodiments, the upward movement of the power source assembly 42 can be effected by virtue of a surface of the power source assembly 42. For example, the bottom of the power source assembly 42 can define an angle that communicates with another surface to guide the power source assembly 42 upwardly upon being translated longitudinally.

In the embodiments shown in the figures, the power source mount assemblies include an input member, a damping member, and an output member, and are configured to fail if a predetermined threshold impact energy is transmitted to the power source assembly 42. As disclosed above, this failure permits the power source assembly 42 to move in the longitudinal direction L of the vehicle 10, resulting in at least a portion of the impact energy input to the power source assembly 42 being dissipated by virtue of the mechanical failure of the first power source mount assemblies 40L, 40R, and an additional portion of the impact energy being transformed into kinetic energy of the power source assembly 42, thereby reducing or even preventing the transmission of a portion of the impact energy into other portions of the space frame assembly 18.

However, embodiments are intended to include or otherwise cover other structures to perform this operation. In fact, embodiments are intended to include any structure that connects the power source assembly 42 to the frame in such a way as to allow the power source assembly 42 to break free from the frame in a controlled manner after absorbing a certain amount of force. In fact, this structure, as an alternative to the separate power source mount assemblies, can be unitarily formed as either a part of the power source assembly 42 or as a part of the frame.

The embodiment shown in FIGS. 8 and 9 include a fuel system protection assembly 202 having a first panel 204, second panel 206 and third panel 208 positioned between the power source assembly 42 and component(s) of the fuel system in order to shield the fuel system component(s) from the power source assembly 42, such as to impede or prevent direct contact between the fuel system component(s) and the power source assembly 42.

However, embodiments are intended to include or otherwise cover any other structures to facilitate protection of the fuel system component(s), such as from direct contact with the power source assembly 42. For example, some embodiments include panels that define a specific structure, shape and/or material to provide enhanced performance in this regard. Still other embodiments include structures other than panels, such as stoppers, that impede or prevent movement of the power source assembly 42 that would result in contact with the fuel system component(s).

Exemplary embodiments are also intended to include or otherwise cover any possible use of processors, computers, electronic controllers, etc. For example, some embodiments utilize processors and/or other electronics that facilitate vibration dampening. Other embodiments include or otherwise cover methods of manufacturing some of the structures disclosed above using processors, computers, controllers, etc. In other words, some of the methods of manufacturing include or otherwise cover processors and computer programs implemented by processors used to design various elements of the frame disclosed above.

Exemplary embodiments are intended to cover all software or computer programs capable of enabling processors to implement the above operations, designs and determinations. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs.

Exemplary embodiments are further intended to cover such software, computer programs, systems and/or processes provided through any other currently known, related art, or later developed medium (such as transitory mediums, carrier waves, etc.), usable for implementing the exemplary operations disclosed above.

These computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Some of the disclosed embodiments include or otherwise involve data transfer over a network, such as communicating various inputs over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network may include multiple networks or subnetworks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice data communications. In one implementation, the network includes a cellular telephone network configured to enable exchange of text or SMS messages.

Examples of a network include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

While the subject matter has been described in detail with reference to exemplary embodiments thereof, it will be apparent to one skilled in the art that various changes can be made, and equivalents employed, without departing from the scope of the invention. All related art references discussed in the above Background Section are hereby incorporated by reference in their entirety.

What is claimed is:

1. An energy management apparatus for use with a vehicle that includes a power source assembly and at least one vehicle component, the energy management apparatus comprising:
    an upper frame that at least partially encloses the power source assembly;
    a lower frame that defines a raised portion disposed longitudinally between the power source assembly and the at least one vehicle component, the raised portion including an inclined portion that defines an acute angle relative to the longitudinal direction and is disposed to guide movement of the power source assembly upwardly in a direction substantially perpendicular to the longitudinal direction and away from at least one component upon movement of the power source assembly in the longitudinal direction; and
    a mount assembly that mounts the power source assembly to the lower frame, the mount assembly being configured to detach the power source assembly from the lower frame upon application of a predetermined threshold impact energy being transmitted to the power source assembly, thereby enabling the power source assembly to move in the longitudinal direction and resulting in dissipation of at least a portion of the impact energy.

2. The energy management apparatus of claim 1, wherein the upper frame includes a pair of pillar members and a cross frame member extending between the pillar members, the cross frame member being disposed between the power source assembly and an interior passenger compartment of the vehicle.

3. The energy management apparatus of claim 1, wherein the raised portion includes a generally vertically extending member disposed at one end of the inclined portion, and a declining portion disposed at another end of the inclined portion.

4. The energy management apparatus of claim 3, wherein the inclined portion defines an obtuse angle with the vertically extending member, and the declining portion declines at a steeper angle than an incline angle of the inclined portion.

5. The energy management apparatus of claim 1, wherein the power source assembly includes an engagement member at a lower surface thereof, and the lower frame includes a cross member disposed and configured to contact the engagement member to impede further longitudinal displacement of the power source assembly if the power source assembly has engaged the inclined portion.

6. The energy management apparatus of claim 1, wherein the upper frame includes a component protection assembly including at least one panel disposed between the power source assembly and the vehicle component to thereby shield the vehicle component from the power source assembly if the power source assembly moves in the longitudinal direction in response to the impact energy, the vehicle component being a fuel system component.

7. The energy management apparatus of claim 1, wherein the lower frame includes first and second sub-frame members, the second sub-frame member including a pair of lateral members and a pair of cross members connecting the lateral members so as to define a generally rectangular configuration.

8. The energy management apparatus of claim 7, wherein the mount assembly includes a pair of separate mount assemblies, and the second sub-frame member includes a pair of mount areas that are each configured to receive one of the pair of mount assemblies, each of the mount areas being disposed at intersections of the lateral members and cross members.

9. The energy management apparatus of claim 8, wherein each of the pair of mount assemblies includes input and output members, and a damping member disposed between the input and output members, the damping member being configured to damp vibrations generated by the power source assembly.

10. The energy management apparatus of claim 9, wherein the first sub-frame member of the lower frame includes a pair of opposite lateral portions and a central portion connecting the lateral portions, the raised portion defining an upper surface of the central portion.

11. An energy management system for use with a vehicle having an interior passenger compartment, the energy management system comprising:
a power source assembly:
at least one vehicle component
an upper frame that at least partially encloses the power source assembly, the upper frame including a pair of vertically extending members and a cross frame member extending between the vertically extending members, the cross frame member being disposed between the power source assembly and the interior passenger compartment;
a lower frame that defines a raised portion disposed longitudinally between the power source assembly and the vehicle component, the raised portion including an inclined portion that defines an acute angle relative to the longitudinal direction and is disposed to guide movement of the power source assembly upwardly in a direction perpendicular to the longitudinal direction and away from the vehicle component upon movement of the power source assembly in the longitudinal direction; and
a mount assembly that mounts the power source assembly to the lower frame, the mount assembly being configured to detach the power source assembly from the lower frame upon application of a predetermined threshold impact energy being transmitted to the power source assembly that results from the external stresses, thereby enabling the power source assembly to move in the longitudinal direction and resulting in dissipation of at least a portion of the impact energy.

12. The energy management apparatus of claim 11, wherein the raised portion includes a generally vertically extending member disposed at one end of the inclined portion, and a declining portion disposed at another end of the inclined portion.

13. The energy management system of claim 12, wherein the inclined portion defines an obtuse angle with the vertically extending member, and the declining portion declines at a steeper angle than an incline angle of the inclined portion.

14. The energy management system of claim 11, wherein the power source assembly includes an engagement member at a lower surface thereof, and the lower frame includes a cross member disposed and configured to contact the engagement member to impede further longitudinal displacement of the power source assembly if the power source assembly has engaged the inclined portion.

15. The energy management system of claim 11, wherein the upper frame includes a component protection assembly including at least one panel disposed between the power source assembly and the vehicle component to thereby shield the vehicle component from the power source assembly if the power source assembly moves in the longitudinal direction in response to the impact energy, the vehicle component being a fuel system component.

16. The energy management system of claim 11, wherein the lower frame includes first and second sub-frame members, the second sub-frame member including a pair of lateral members and a pair of cross members connecting the lateral members so as to define a generally rectangular configuration.

17. The energy management system of claim 16, wherein the mount assembly includes a pair of separate mount assemblies, and the second sub-frame member includes a pair of mount areas that are each configured to receive one of the pair of mount assemblies, each of the mount areas being disposed at intersections of the lateral members and cross members.

18. The energy management system of claim 17, wherein each of the pair of mount assemblies includes input and output members, and a damping member disposed between the input and output members, the damping member being configured to damp vibrations generated by the power source assembly.

19. The energy management system of claim 18, wherein the first sub-frame member of the lower frame includes a pair of opposite lateral portions and a central portion connecting the lateral portions, the raised portion defining an upper surface of the central portion.

20. A method of enhancing energy management performance upon application of external stresses to a vehicle that includes a power source assembly and at least one vehicle component, the method comprising:
- enclosing the power source assembly with an upper frame;
- mounting the power source assembly to a lower frame with a mount assembly that is configured to detach the power source assembly from the lower frame upon application of a predetermined threshold impact energy being transmitted to the power source assembly that results from the external stresses, thereby enabling the power source assembly to move in the longitudinal direction and resulting in dissipation of at least a portion of the impact energy; and
- guiding movement of the power source assembly upwardly in a direction perpendicular to the longitudinal direction and away from the vehicle component upon movement of the power source assembly in the longitudinal direction, the guiding being performed with a raised portion of the lower frame that is disposed longitudinally between the power source assembly and the vehicle component, the raised portion including an inclined portion that defines an acute angle relative to the longitudinal direction.

* * * * *